(12) United States Patent
Leonard et al.

(10) Patent No.: US 10,789,799 B2
(45) Date of Patent: Sep. 29, 2020

(54) SYSTEM AND METHOD FOR SMART IDENTIFICATION

(71) Applicant: True Access, L.L.C., Tucson, AZ (US)

(72) Inventors: Geoff Leonard, Tucson, AZ (US); Darren Peress, Tucson, AZ (US)

(73) Assignee: True Access LLC, Tucson, AZ (US)

( * ) Notice: Subject to any disclaimer, the term of this patent is extended or adjusted under 35 U.S.C. 154(b) by 0 days.

(21) Appl. No.: 16/261,081

(22) Filed: Jan. 29, 2019

(65) Prior Publication Data

US 2019/0236866 A1 Aug. 1, 2019

Related U.S. Application Data

(60) Provisional application No. 62/623,428, filed on Jan. 29, 2018.

(51) Int. Cl.

| | |
|---|---|
| *G07C 9/25* | (2020.01) |
| *H04W 4/02* | (2018.01) |
| *G07C 9/00* | (2020.01) |
| *H04W 4/80* | (2018.01) |
| *G07C 9/28* | (2020.01) |
| *G07C 9/29* | (2020.01) |

(52) U.S. Cl.
CPC ........... *G07C 9/29* (2020.01); *G07C 9/00309* (2013.01); *G07C 9/00571* (2013.01); *G07C 9/253* (2020.01); *G07C 9/28* (2020.01); *H04W 4/02* (2013.01); *H04W 4/80* (2018.02)

(58) Field of Classification Search
CPC .................................................. G07C 9/00111
See application file for complete search history.

(56) References Cited

U.S. PATENT DOCUMENTS

| | | | | |
|---|---|---|---|---|
| 7,176,849 B1* | 2/2007 | Mooney | ............. | G07C 9/00031 345/2.3 |
| 9,033,247 B2* | 5/2015 | Krawczewicz | ......... | G06F 21/34 235/492 |
| 2010/0169378 A1* | 7/2010 | Tinberg | .............. | G07C 9/00158 707/781 |
| 2016/0063779 A1* | 3/2016 | Libin | ................. | G07C 9/00007 340/5.6 |
| 2017/0270723 A1* | 9/2017 | He | ..................... | G07C 9/00119 |

* cited by examiner

*Primary Examiner* — Daniell L Negron
(74) *Attorney, Agent, or Firm* — Joel Cortney Watkins (57) ABSTRACT

A system and method of using a smart identification badge is configured to receive a user credential for identifying a user; determine a location of the user; verify an access right for the user at the location by comparing the user credential and location to an access list associated with the location; and activate a visual identifier on the smart identification badge upon verification of the user's access right.

20 Claims, 9 Drawing Sheets

SYSTEM AND METHOD FOR SMART IDENTIFICATION

CROSS-REFERENCE TO RELATED APPLICATION(S)

The present application claims priority to and the benefit of U.S. Provisional Patent Application No. 62/623,428 filed on Jan. 29, 2018, the content of which is incorporated herein by reference in its entirety.

BACKGROUND

1. Field

Some embodiments of the present disclosure relate an identification system.

2. Description of the Related Art

Many buildings and businesses make visitors and vendors sign in or perform identity verification before issuing the visitor/vendor a credential (e.g., a temporary identification) that provides the visitor with access to a location or area of within a location. For example, vendors visiting a hospital may initially be required to verify their employment, pass a background check, and pass a medical screening. After initially becoming authorized, vendors still need to visit a kiosk to be issued a temporary identification. Verifying a person's identity and access rights is often a time consuming process that aggravates vendors who frequently visit a variety of locations. A more time-effective and secure system is therefore desired.

The above information is only for enhancement of understanding of the background of embodiments of the present disclosure, and therefore may contain information that does not form the prior art.

SUMMARY

Aspects of embodiments of the present disclosure are directed toward a system and method for a smart identification system. In various embodiments, the smart identification system is configured to allow for a user to verify their identity and location in order to activate a visual identifier on a smart identification badge while they are at the location.

In various embodiments, a method of using a smart identification badge includes determining that a user has arrived at a secure. A user credential and their location are used for verifying an access right for the user at the location by comparing the user credential and location to an access list associated with the location. Upon verification a visual identifier on the smart identification badge is activated.

In various embodiments, receiving the user credential includes connecting the smart identification badge to an electronic device and supplying the user credential from the electronic device.

In various embodiments, the user credential includes at least one of a user identifier, a biometric information, or a login credential.

In various embodiments, determining a user has arrived at a secure location includes monitoring a user's location using the electronic device and determining when the user has arrived at the secure location.

In various embodiments determining the user's location includes using at least one of a global positioning system (GPS) signal or a marker physically located at the location.

In various embodiments, verifying the access right for the user at the location includes sending the user credential and location to a remote server and verifying the access right for the user by the remote server, wherein the access list associate with the secure location is stored on the remote server.

In various embodiments, method further includes determining an end of the access right and deactivating the visual indicator.

In various embodiments, determining the end of the access right includes at least one of determining a time period has expired or determining the user has left the location.

In various embodiments, a smart identification system includes: a smart identification module operating on a smart identification badge, wherein the smart identification module is configured to control the operation of a visual indicator on the smart identification badge; an authentication module operating on an electronic device at a same location as the smart identification badge, wherein the authentication module is configured to: communicate with the smart identification module; determine the when the smart identification badge is at a secured location; and store a user credential for identifying a user; and a verification module operating on a remote server, wherein the verification module is configured to: communicate with the authentication module to receive the location and user credential; verify an access right for the user at the location by comparing the user credential and location to an access list associated with the location; and supply an activation signal for the visual identifier upon verification of the user's access right to the smart identification module.

In various embodiments, the communications circuit includes at least one of a near field communications circuit, a radio frequency identification circuit, a Wi-Fi communications circuit, and a Bluetooth communications circuit.

In various embodiments, the authentication module is further configured to monitor a location of the smart identification badge and determine when the smart identification badge has arrived at the secure location.

In various embodiments, the location of the smart identification badge is determined using at least one of a global positioning system (GPS) signal or a marker physically located at the location.

In various embodiments, the authentication module is further configured to provide a key to the smart identification badge and the smart identification module is configured to verify the key with an embedded key stored on the smart identification device before allowing further communications with the authentication module.

In various embodiments, the user credential includes at least one of a user identifier, a biometric information, or a login credential supplied by the user to the electronic device.

In various embodiments, the verification module is further configured to supply a time period that the visual identifier will remain active in addition to the activation signal.

In various embodiments, the smart identification module is further configured to deactivate the visual identifier after the time period has expired or when the user has left the location.

In various embodiments, the smart identification badge includes: a communications circuit; a memory; a processor configured to execute instructions stored in the memory, that when executed by the processor, cause the processor to: connect to an electronic device using the communications circuit; and activate a visual indicator after receiving an activation signal from the mobile device using the communication circuit.

In various embodiments the communications circuit comprises at least one of a NFC circuit, a Wi-Fi communications circuit, a RFID circuit, and a Bluetooth communications circuit.

In various embodiments, the activation signal further includes a door access code configured to allow the smart identification badge to open at least one door at the location using the communications circuit.

In various embodiments, the memory further stores an embedded key and wherein the instructions further cause the processor to: receive a key from the electronic device using the communications circuit; verify the key received from the electronic device corresponds to the embedded key; and allow for further communications from the electronic device using the communications circuit upon verification of the key.

In various embodiments, the smart identification badge includes a display, wherein the instructions are further configured to cause the processor to activate the display.

BRIEF DESCRIPTION OF THE DRAWINGS

Some embodiments can be understood in more detail from the following description taken in conjunction with the accompanying drawings, in which.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for a smart identification system. In various embodiments, the system includes a badge having a visual indicator to show when a user is authorized to enter a location and a verification system to authenticate the user. The badge may be assigned to a user after the user undergoes a registration with a secure location. Later use of the badge may be authorized automatically by recognizing when the user has arrived at the secured location. In some embodiments, a user may be authorized by providing a password or biometric authorization to the verification system to authenticate the identity of the user. The access rights of the authenticated user for the location may be verified by the verification system and the system may activate a visual indicator on the badge showing that the user has authorization.

Figure 1A:
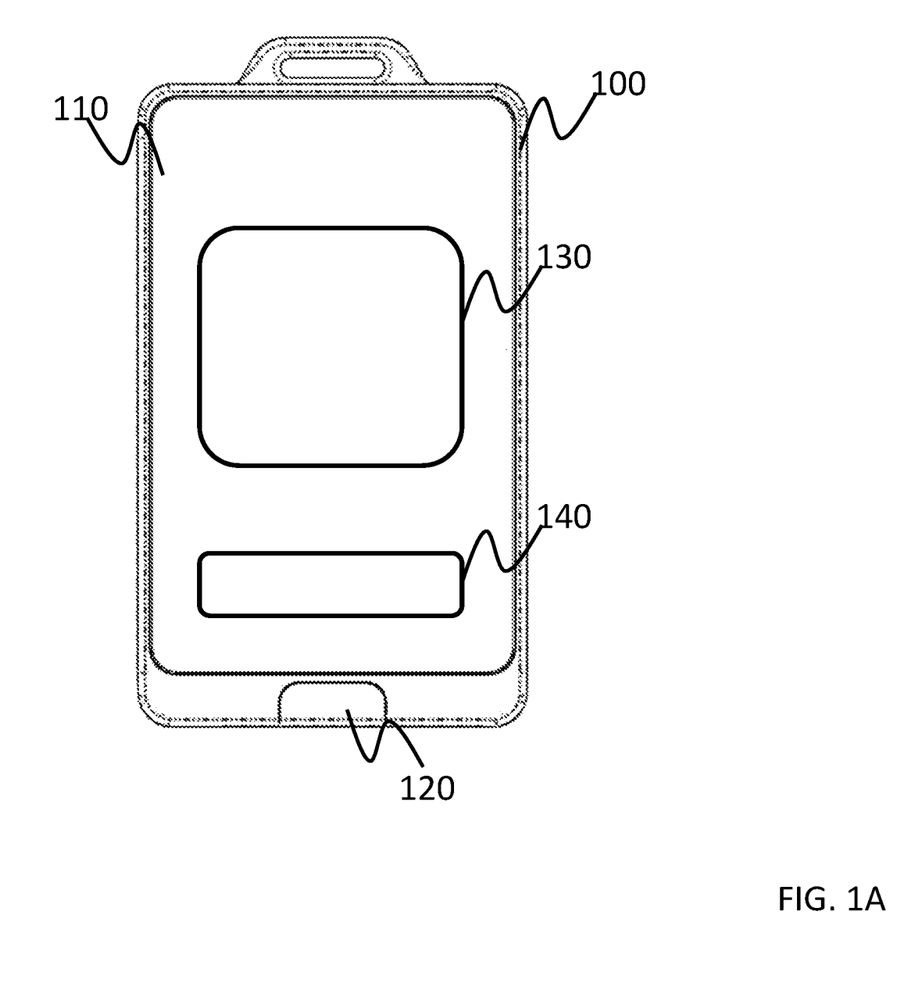
FIG. 1A depicts the outside of an embodiment of a smart identification badge for use in various embodiments of the smart identification system.

FIG. 1A depicts the outside of an embodiment of a smart identification badge for use in various embodiments of the smart identification system.

Referring to FIG. 1A, in various embodiments, a smart identification badge 100 is configured to be worn by a user and provide access credentials and a visual indicator when the user is authorized to be present in an area. In this example, the smart identification badge includes a front face 110 having a visual indicator 120. The front face may include various elements or credentials for identifying the wearer of the smart identification badge 100. For example, a picture 130 of the user may be included on the front face 110 as well as a user's name and employer information 140. In various embodiments, the user's picture 130 and name/employer information 140 may be printed on the front face 110, while in other embodiments, the front face 110 may include a display for providing various elements or credentials. For example, the front face 110 may include a suitable display such as a liquid crystal display (LCD), an organic light-emitting diode (OLED) display, an electronic ink display, or any other suitable type of display as would be understood by one skilled in the art.

In some embodiments, the visual indicator 120 may include a light emitting diode (LED) (e.g., a multicolored LED) for displaying the user's status. In other embodiments, the visual indicator 120 may be provided by the display. For example, when a user is authorized to be in an area and has been authenticated, the visual indicator 120 may emit a light (e.g., a green light or any other suitable color light). When a user is not authorized to be in an area or has not been authenticated, the visual indicator 120 may emit a red light (or other suitable color) or no light at all.

Figure 1B:
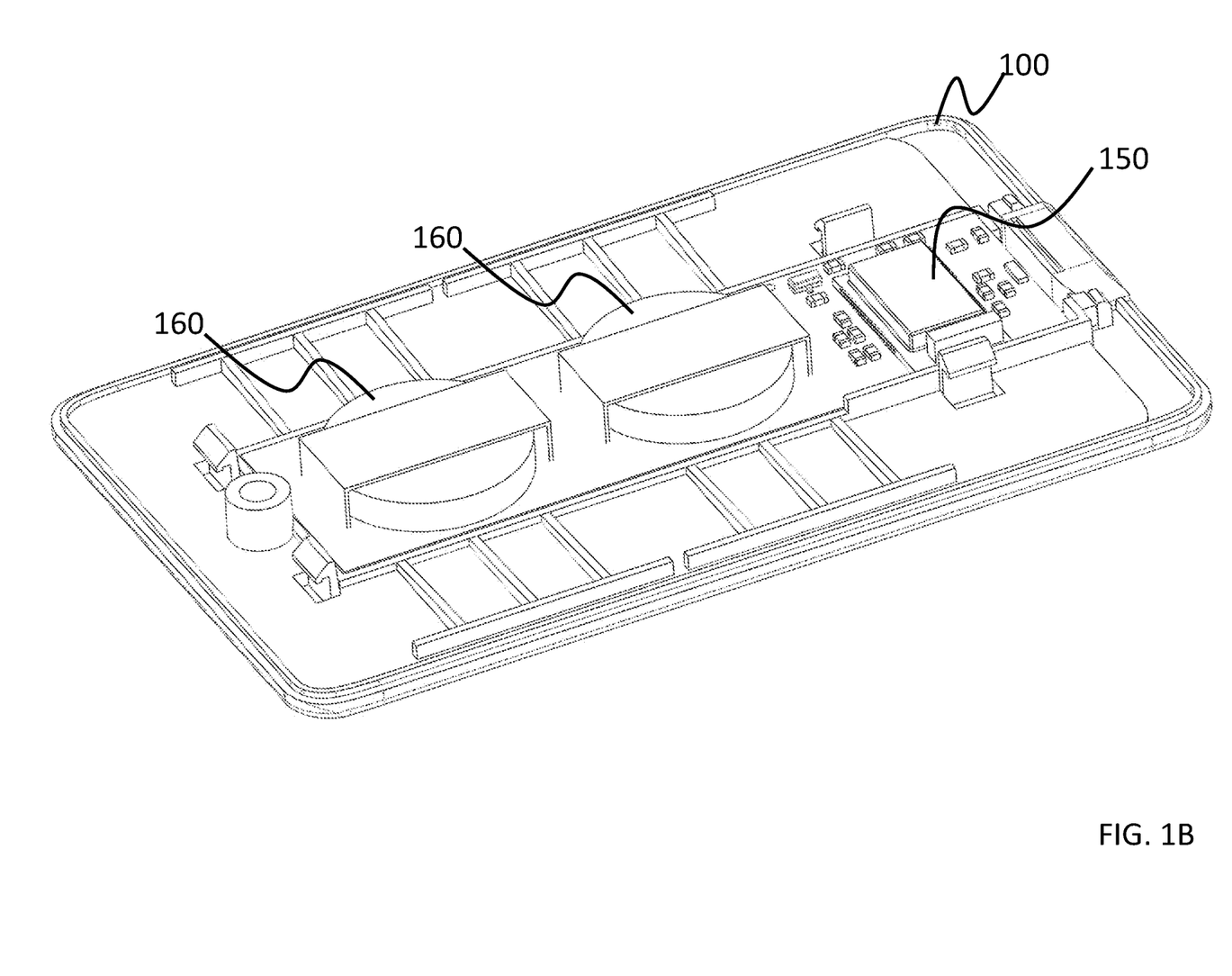
FIG. 1B depicts the internals of an embodiment of a smart identification badge for use in various embodiments of the smart identification system.

FIG. 1B depicts the internals of an embodiment of a smart identification badge for use in various embodiments of the smart identification system.

Referring to FIG. 1B, in various embodiments, the smart identification badge 100 may include an electronic circuit 150 and one or more batteries 160. In various embodiments, the electronic circuit 150 includes processing circuitry and communications circuitry for the operation of the smart identification badge 100. In various embodiments, the electronic circuit 150 includes a driver for activating the visual indicator, a processor or SoC and communications circuit for connecting to a mobile device such as a smartphone. For example, in one embodiment, the electronic circuit 150 may be configured to securely connect to a smartphone using an embedded pass key that only allows for communication with an application operating on the user's smartphone. Upon authentication of the user and the current location using the smartphone, the electronic circuit receives a command from the application to activate the visual indicator.

In another example, the electronic circuit 150 may be configured to authenticate a user's identity in conjunction with one or more sensors and/or user input, verify a user location, and connect to remote devices such as a smart phone and/or a remote server. For example, the electronic circuitry may include a system-on-chip (SoC) that includes a processor, memory, persistent storage, and communications circuitry (e.g. Wi-Fi, Bluetooth, NFC, cellular, etc.). The electronic circuitry 150 may also include any necessary power regulation circuitry and any LED or LCD driver circuitry for driving the visual indicator or display. In various embodiments, the electronic circuitry 150 may also include a GPS receiver. In some embodiments, the electronic circuitry may include an NFC, RFID, or other close proximity identification circuitry for opening access controlled doors.

Figure 2A:
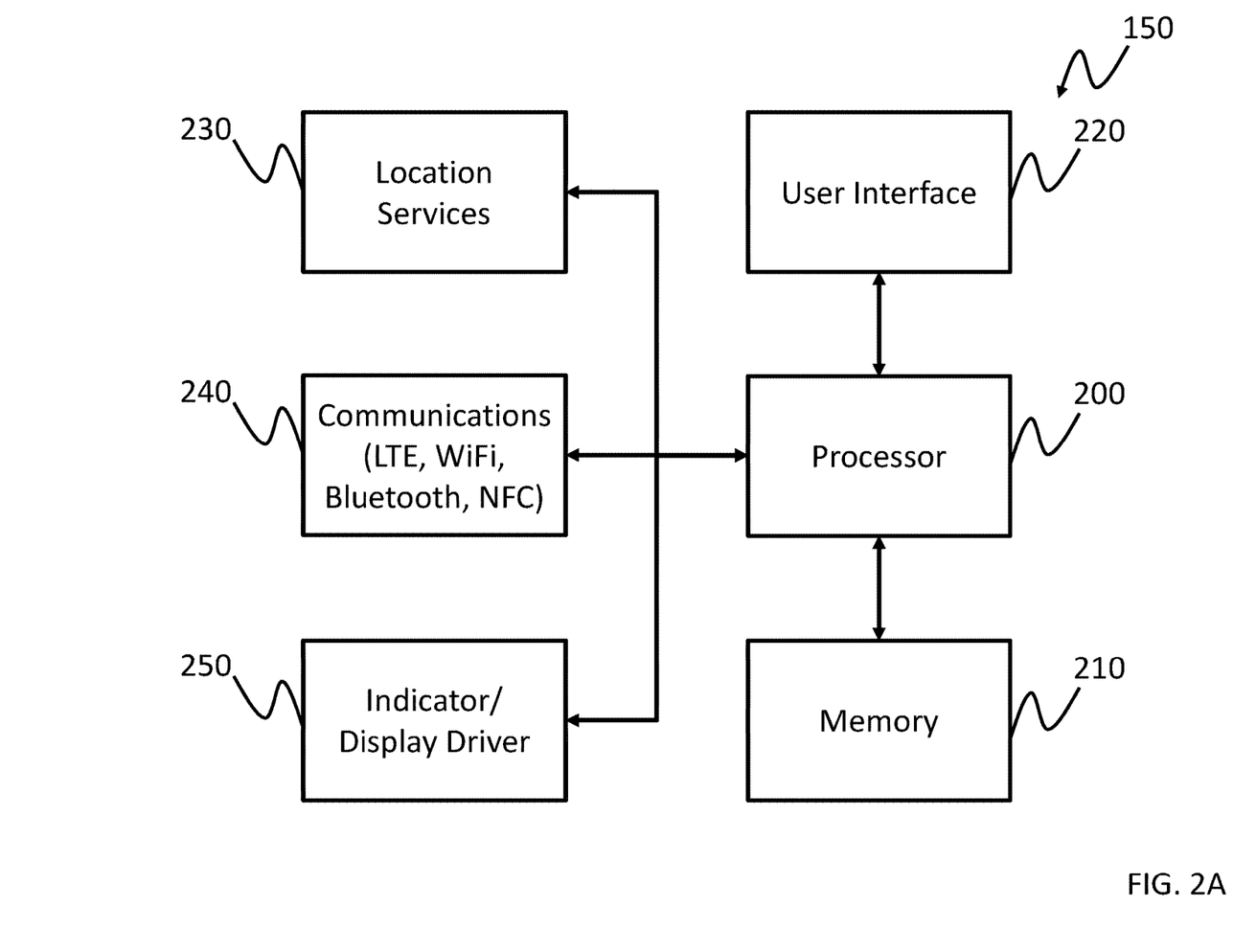
FIG. 2A depicts a block diagram of the electronic circuitry according to various embodiments.

FIG. 2A depicts a block diagram of the electronic circuitry according to various embodiments.

Referring to FIG. 2A, in various embodiments the electronic circuitry 150 is configured to enable the operation of the smart identification badge. For example, the electronic circuitry may include processor 200, a memory 210, a user interface 220, location services 230, communications 240, and an indicator/display control 250. Each of the various components may be integrated into a single system on chip (SoC) design, or may be discreet components. In some embodiments, various components may be located on another device in communication with the electronic circuitry 150. For example, in various embodiments, the user interface 220 and location services 230 may be located on a device connected to the electronic circuitry 150 using the communications 240.

In various embodiments, the electronic circuitry may include a processor 200 and a memory 210. The processor 200 and memory are configured to allow for the execution of instructions stored on the memory 210 that enable the operation of the smart identification badge. For example, the processor may be configured to receive input from a user interface 220 and location services 230 to authenticate the user's identity and location. In various embodiments, the processor 200 may then utilize the communications link 240 to communicate with a remote verification system in order to determine if the authenticated user has permission to be at the user's location. When a user is verified as having permission, the processor 200 may activate the visual indicator using the indicator/display control 250.

In various embodiments, the user interface 220 may be integrated into the smart identification badge. The user interface 220 may include one or more input devices that allow for a user to provide information (e.g., a user credential) for authenticating their identity. For example, the user interface 220 may include an alphanumeric or numeric input such as a keypad, a keyboard, and/or a touch screen for supplying a user id and/or password. In some embodiments, the user interface 220 may include one or more biometric sensors for receiving biometric information from the user and performing biometric authentication of the user using the biometric information. For example, the biometric sensors may include a fingerprint sensor, a retinal scanner, a camera, a voice identification system, a facial recognition system or any other suitable biometric sensor as would be understood by those skilled in the art.

In various embodiments, location services 230 may include one or more circuits for determining the location of the smart identification badge. For example, the location services 230 may include a GPS receiver, an accelerometer, or other suitable location determining system.

In various embodiments, the communication circuit 240 may include one or more circuits for enabling wireless or wired communications between the smart identification badge and another device used in the authentication and verification of a user's access rights and for providing access to secured areas. For example, the communications circuit 220 may include circuitry for longer range communications and shorter range communications. For example, the communications circuit 220 may include a cellular communications device for connecting the badge to a cellular network such as a 3G, LTE, 5G, or other suitable cellular network. The communications circuit 220 may also include circuits for a Wi-Fi connection, a Bluetooth connection, a near field communications connection (NFC), a radio-frequency identification (RFID) connection, or any other suitable method of communications.

In various embodiments, the indicator/display driver 250 is configured to appropriately activate the visual indicator. For example, in some the indicator/display driver 250 may be an LED driver, while in other embodiments, the indicator/display driver 250 may be a suitable display driver for operating an LCD, OLED, EInk, or other suitable display.

Figure 2B:
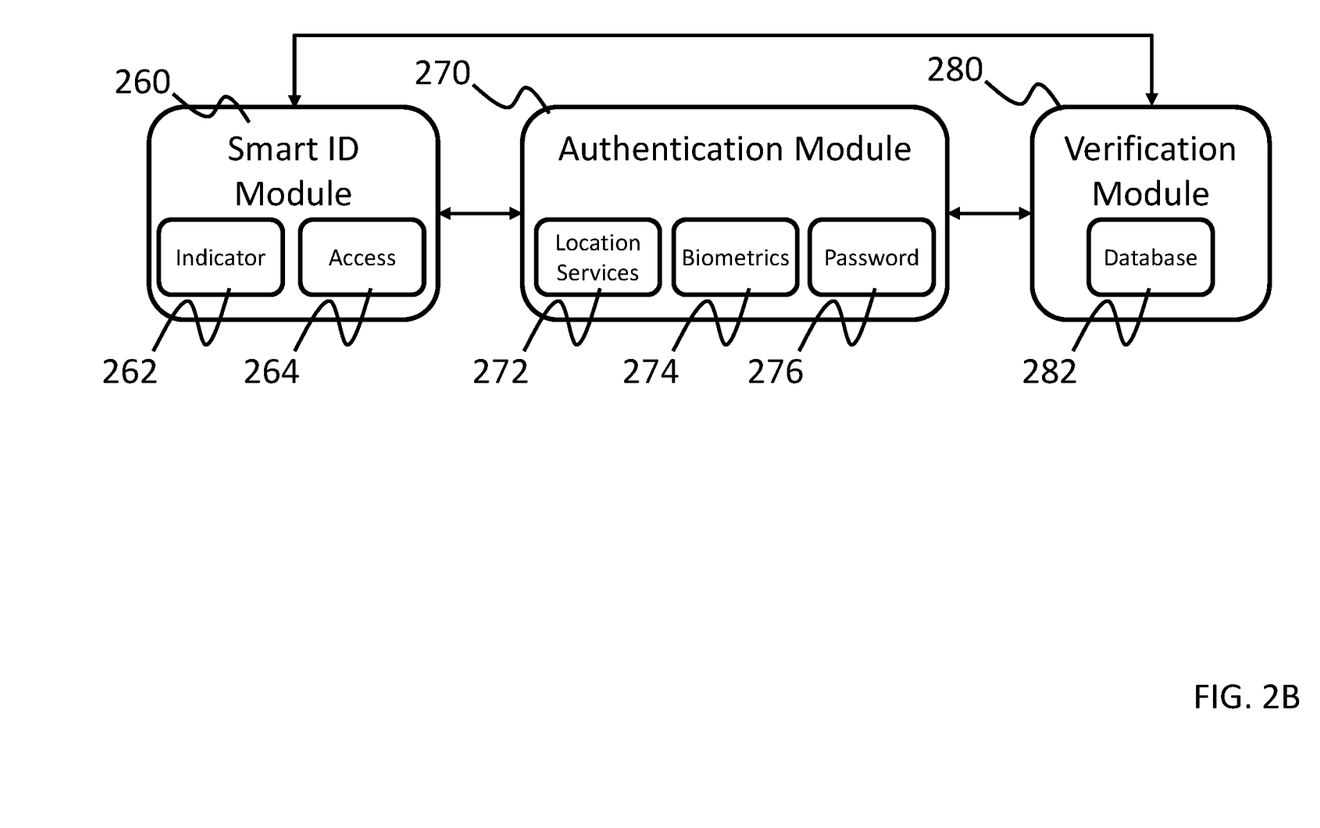
FIG. 2B depicts an architectural block diagram of one or more application modules operating in the smart identification system

FIG. 2B depicts an architectural block diagram of one or more application modules operating in the smart identification system.

Referring to FIG. 2B, in various embodiments, the smart identification system may include a smart ID module 260, an authentication module 270, and a verification module 280 that are configured to process the authentication of the user, verification of a user's access rights, and control the activation of the visual indicator and badge access. In some embodiments, the modules may all operate on the smart identification badge. In other embodiments, one or more modules may operate on separate computing devices. For example, in various embodiments, the smart ID module 260 may be configured to operate on the smart identification badge, the authentication module 270 may be configured to operate on a separate electronic device such as the user's mobile device, and the verification module 280 may be configured to operate on a server or other suitable computing device. In other embodiments, the smart ID module 260 and the authentication module 270 may be configured to operate on the smart identification badge and the verification module 280 may operate on a server. In various embodiments, the various functionalities of the modules may be divided across one or more devices. For example, the some functionalities of the smart ID module 260 may operate on a first device and other functionalities may operate on a second device.

In various embodiments, the smart ID module 260 is configured with an indicator module 262 for controlling the activation and deactivation of the visual indicator. The smart ID module 260 may also have an access module 264 that is configured to utilize the communications of the smart identification badge (e.g., the communication circuit 240) to allow for the ability to utilized proximity-based identification systems (e.g., an NFC or RFID-based access system) to gain access to secured areas.

In various embodiments, the authentication module 270 may be configured to facilitate the authentication of the user's identity. For example, the authentication module 270 may be configured to acquire the system's location (e.g., the location services 230) to determine the current location of the user/smart identification badge and utilize user credentials (e.g., a user identifier, biometric information and/or login credentials). In various embodiments, a location services module 272 may be configured to determine a GPS location of the user/smart identification badge by utilizing the location services 230. In various embodiments, the location services module 272 may be configured to determine a physical location of the smart identification badge by utilizing the communication circuit 240. For example, a location may have a station or beacon for scanning the smart identification badge upon arrival and location information may be provided by a Wi-Fi, NFC, RFID, or other connection to the station.

In some embodiments, the biometrics module 274 may be configured to utilize biometric sensors (e.g., from the user interface 220) to biometrically authenticate the identity of the user. In some embodiments, a password module 276 may utilize the alphanumeric or numeric input (e.g., from the user interface 220) to accept a user's login credentials such as a username and password. In various embodiments, the biometric information may be used instead of the login credentials, the login credentials may be used instead of the biometric information, or both the biometric information and login credentials may be used. In various embodiments, the biometrics module 274 and password module 276 may not be used, and a user identifier may be used instead.

In various embodiments, the authentication module 270 may be supplied with a user identifier configured to verify the identity of the user. For example, the user identifier may be a user identification (e.g., a user name) or may be a unique token (e.g., a security or access token) assigned to the user to verify their identity. In various embodiments, the user identifier may be encrypted.

In various embodiments, the authentication module 270 may be configured to monitor the user's location and determine when they have arrived at the secured location. For example, the authentication module 270 may continuously or periodically check the current location of the user and determine when the user has entered the secured location or is in close proximity to the secure location (e.g., within 10 feet, 20 feet, 100 feet, or any other suitable proximity).

In various embodiments, the verification module 280 may be configured to receive the user's location and user credentials and verify whether the user is authorized to be at the user's location. In various embodiments, the verification module 280 may include a database module 282 that includes an authorization list of user credentials for verifying the identity of the user (e.g., their user identification, biometric information and/or login credentials) and the locations that the user has permission to access. The verification module 280 may then provide the smart ID module 260 with a signal or command to for the indicator module 262 activate the visual identifier according to the verification and provide any needed information for the access module 264.

In various embodiments, the verification module 280 may provide the smart ID module 260 with additional information regarding the permissions afforded with their visit to each of the smart ID module 260 and the authentication module 270. For example, the location services module 272 may monitor (e.g., continuously or at intervals) the location of the user and if they leave a geographic area, the user's access rights may be revoked and the indicator deactivated and/or access disabled. In various embodiments, the system may provide access rights for a period of time (e.g., a predetermined period of time associated with a location).

Figure 3A:
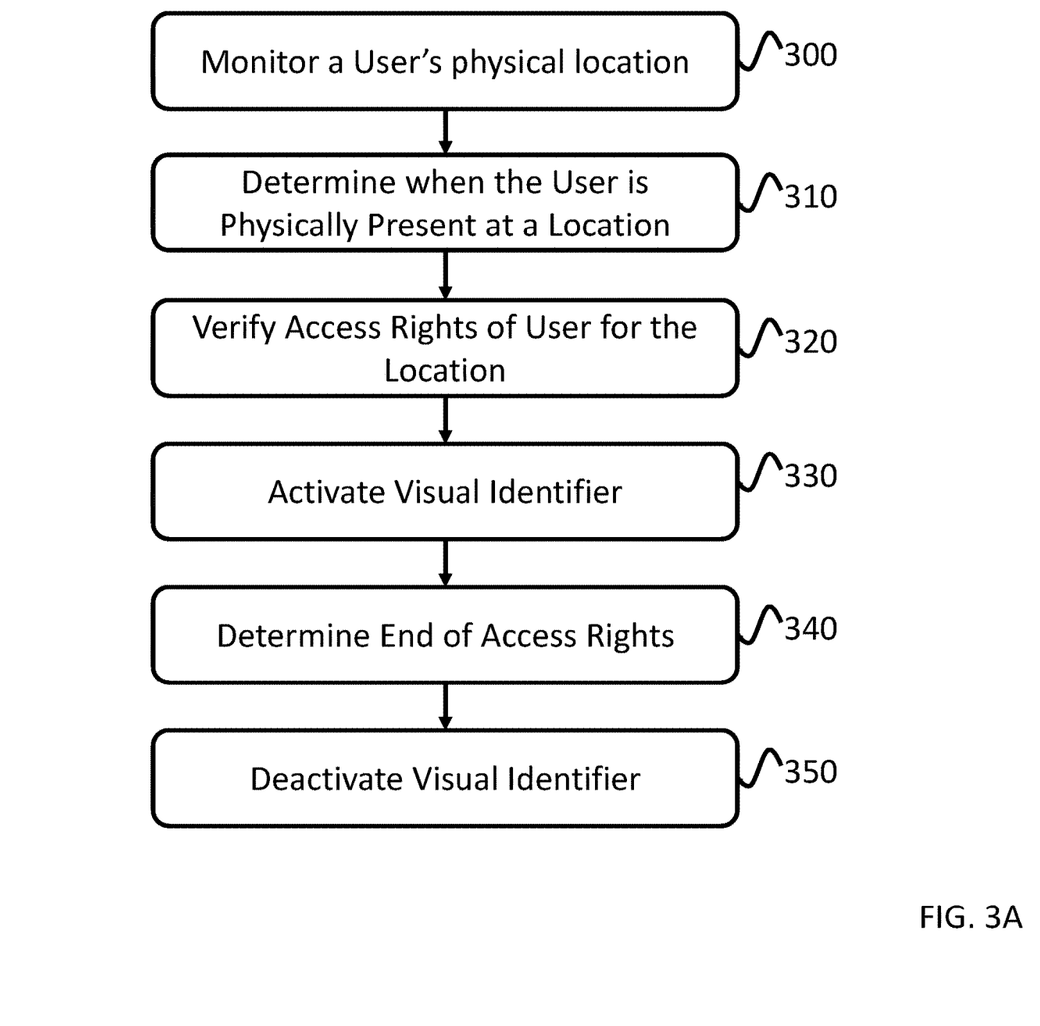
FIG. 3A depicts an example method of using a smart identification system.
Figure 3B:
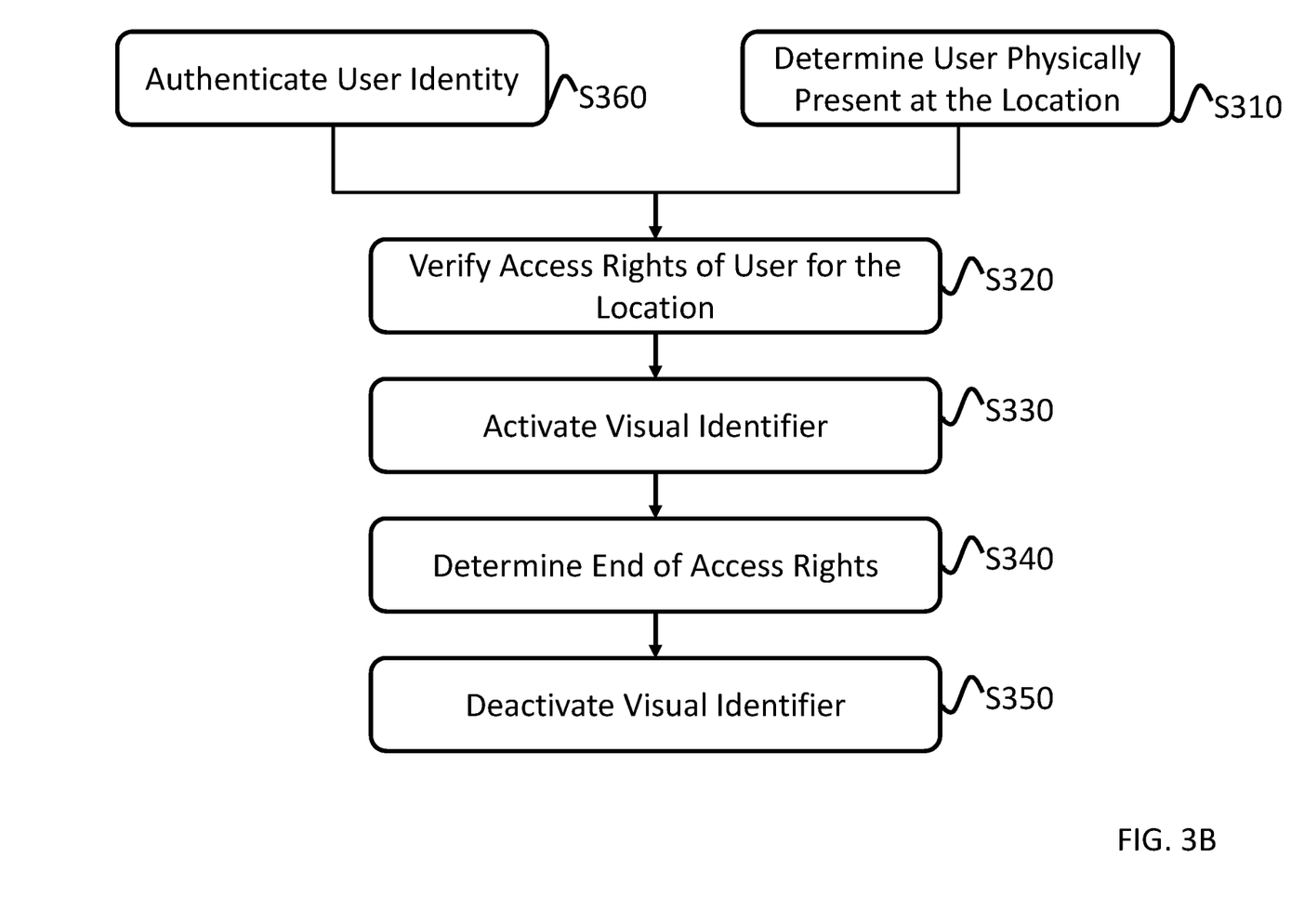
FIG. 3B depicts an example method of using a smart identification system.

FIGS. 3A and 3B depict example methods of using a smart identification system.

Referring to FIG. 3A, a method for using a smart identification system may include a reusable badge (e.g. the smart identification badge of FIGS. 1A, 1B, 2A, and 2B). The system and method may utilize location services (e.g. GPS, NFC, or other location service) and user authentication to determine whether the badge should display a visual indicator to show that a user is authorized to be present in an area. For example, in various embodiments, the system may monitor a user's physical location (S300). For example, in various embodiments, the authorization module may be configured to determine the user's location and when the user has entered or is within a proximity threshold of the secure location. In various embodiments, the system may monitor the physical location of the user (S300). For example, a user may access a smart identification application operating on the user's smartphone. The smart identification application may function as the authorization module and, upon accessing the application, the application may begin monitoring the user's application. As the system monitors the user's location, the system may determine that the user has arrived at or is within a proximity threshold of a secure location (S310).

Referring to FIG. 3B, a method for using a smart identification system may include a reusable badge (e.g. the smart identification badge of FIGS. 1A, 1B, 2A, and 2B). The system and method may utilize location services (e.g. GPS, NFC, or other location service) and user authentication to determine whether the badge should display a visual indicator to show that a user is authorized to be present in an area. For example, in various embodiments, a user may authenticate their identity (S360). User authentication may be accomplished a number of ways. For example, a user may access a smart identification application operating on the user's smartphone. Upon accessing the application, the application may utilize a graphical user interface to prompt the user for a passcode, a biometric authentication (e.g. a fingerprint, facial scan, retinal scan, etc.), or both. As described above, in some embodiments, the user identification may be automatic and not require further input from the user. In some embodiments, a user may be prompted as to whether they would like to activate their smart identification badge.

In other embodiments, the user authentication may be embedded in the smart identification. For example, in some embodiments, the smart identification includes an input for a user to enter a password. In other embodiments, the smart identification may include a biometric sensor such as a fingerprint reader, a camera for performing a facial or retinal scan, or any other biometric sensor.

Referring to FIGS. 3A and 3B, in addition to verifying a user's identity, the system is further configured to verify the physical location of the user (S310). For example, in some embodiments, the smart identification badge may include a GPS receiver. In other embodiments, the smart identification badge may connect to the smart identification application and access the smartphone's location services or other sensors to verify the current location of the user (e.g. using GPS). In some instances, for example, inside a building, GPS may not be available. In these cases, an alternative method of identifying the user's location may be utilized. For example, the location may include a unique marker or beacon to identify the location. In some embodiments, the location may have an electronic marker having NFC and a user may use their smartphone's NFC to verify their presence at the location. In other embodiments, the system may utilize other methods of indoor tracking, such as a Bluetooth beacons, Wi-Fi networks, inertial measurements, etc. to verify the user's location. In other embodiments, the marker may be a physical marker that is visually recognizable such as a QR code.

In various embodiments, the system may then determine the user's access privileges at their current secure location (S320). For example, a user may have access rights at certain secure locations at certain times and for certain periods of times. Upon authenticating the user's identity and location, the system may then check an authorization list to determine if the user is authorized to access the secure location. In various embodiments, one or more authorization lists may be stored in a database. In various embodiments, the database may be locally stored on the smart identification badge or on the user's smartphone. In other embodiments, the database is stored on a remote server. The smart identification badge may connect to the remote server utilizing either its own Wi-Fi or cellular connection or may connect to the remote server utilizing the user's smartphone. A unique identifier associated with the user (e.g. user's name, username, or any other identifier) along with the user's location may be sent to the remote server. The remote server uses the supplied information to identify the appropriate authorization list and return whether the user is authorized to be at the secure location.

In various embodiments, each user may have an authorization list specifying each secure location and time they are authorized to access the location. In other embodiments, each location may have a list of authorized users and include when they are authorized to access those locations.

In some embodiments, a single building (e.g. a hospital) may have multiple authorization lists for different areas of the building (e.g. separate lists for the emergency department, ICU, surgical centers, pharmacies, etc.).

Upon verifying the user's access rights from the authorization list, the smart identification will activate the visual indicator to show the use is authorized to be at the location (S330). In various embodiments, in addition to sending the authorization to activate the visual indicator, a time period (e.g. 1 hour, 3 hours etc.) may also be included. In various embodiments, an RFID circuit, NFC circuit, or any other suitable short-range communications circuit, may be also activated by sending the smart identification badge a door access code so that the user may open doors at the location. After the time period is completed, the visual indicator is either deactivated or shows a color indicating the user does not have authorization (S340). In other embodiments, the visual indicator may remain active for as long as the user is at the location. For example, the system may periodically check the user's GPS location (or other location system) to verify that they are still present at the location. In other embodiments, the system may require the user to re-authenticate after a certain time period. Once the access rights have been determined to be expired, the system deactivates the visual identifier (S350).

Figure 4A:
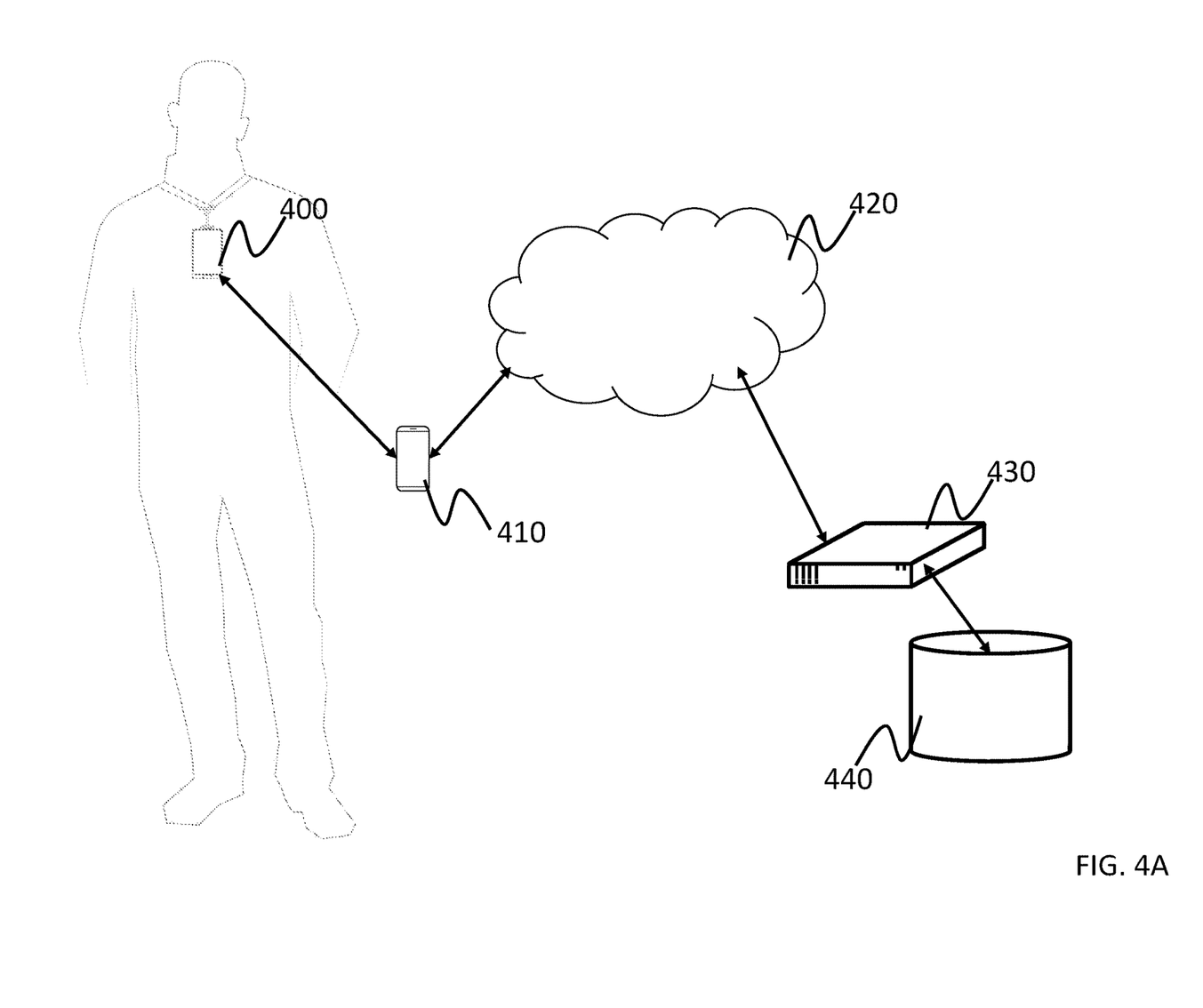
FIGS. 4A-4C depict example embodiments of the smart identification system.
Figure 4B:
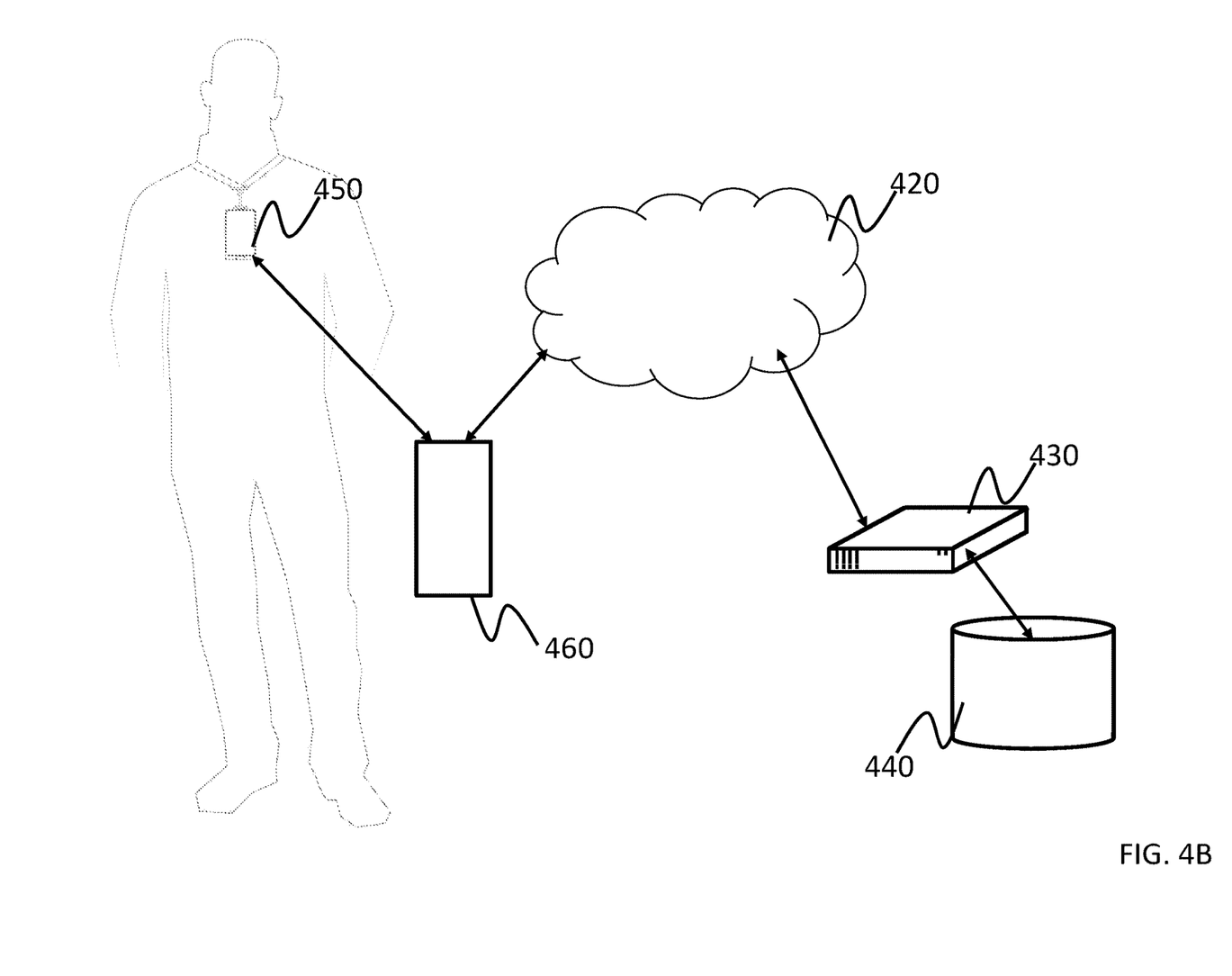
Figure 4C:
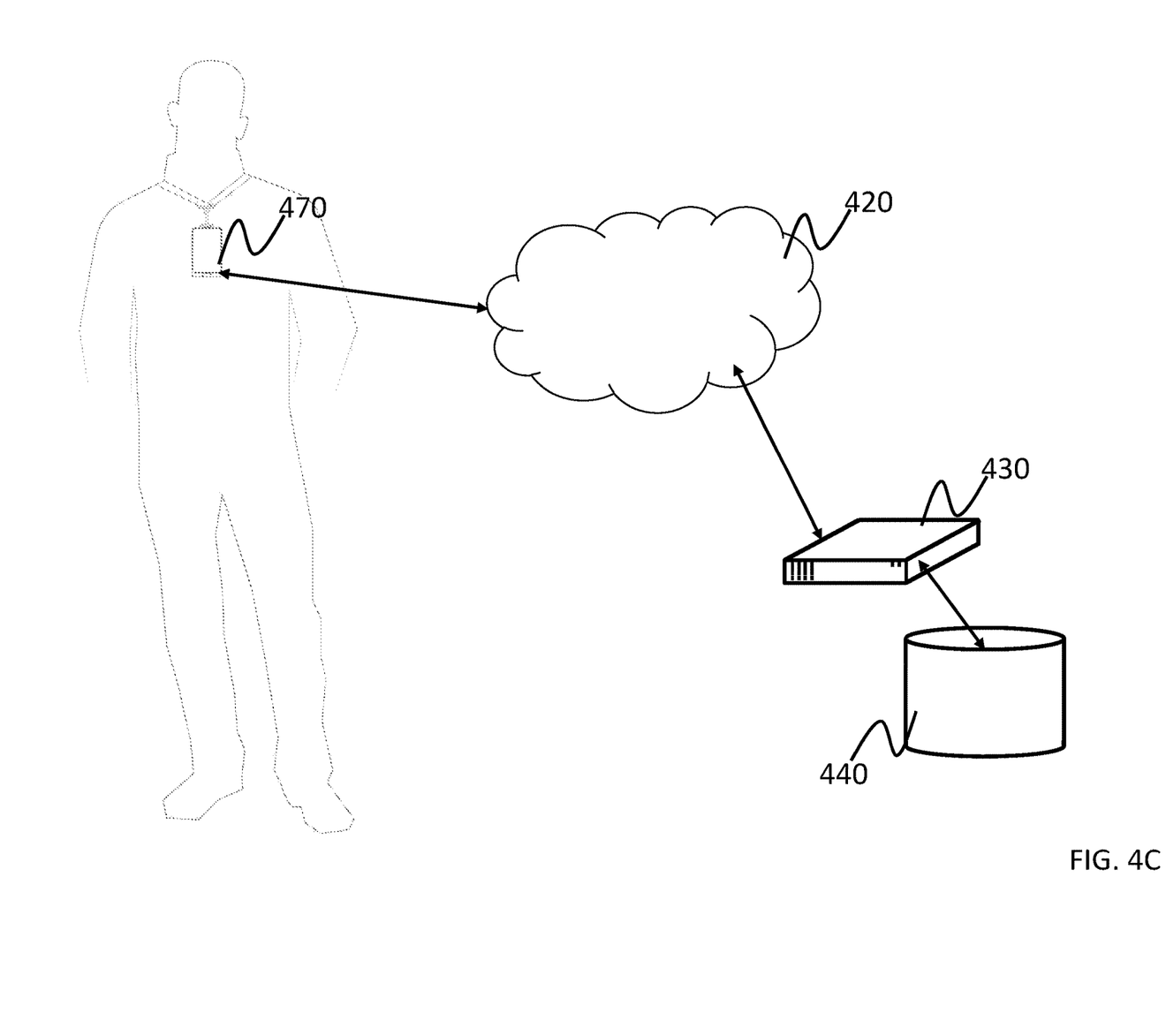

FIG. 4A depicts an example embodiment of the smart identification system. 4B depicts an additional example embodiment of the smart identification system that utilizes a site device. 4C depicts an additional example embodiment of the smart identification system.

Referring to FIG. 4A, in various embodiments, the smart identification system includes the smart identification badge 400. In this embodiment, the smart identification badge 400 is configured to communicate with an electronic device such as a user's mobile device 410 (e.g. a smartphone, tablet, laptop etc.) using Bluetooth or other suitable form of communications. The mobile device 410 is in turn configured to communicate with a remote server 430 using a network 420. In various embodiments, the smart identification badge 400 may operate a smart ID module (e.g., the smart ID module 260), the mobile device 410 may operate an authentication module (e.g., the authentication module 270), and the remote server 430 may operate a verification module (e.g., the verification module 280).

In various embodiments, the smart identification badge 400 may also include an encrypted embedded key that only allows Bluetooth communications with a mobile device 410 that includes the appropriate application operating on the device and corresponding encrypted key. The application operating on the user's mobile device 410 is also configured to facilitate the operation of a visual indicator on the smart identification badge 400. For example, in various embodiments, the user may access the application on the mobile device 410 when they are at a location that utilizes the smart identification system. The user may access the application to provide their authentication credentials (e.g. a password and/or a biometric authentication) and the application may utilize the mobile device 410 to determine the user's location (e.g. using GPS, Bluetooth, Wi-Fi, etc. from the communications 240 and location services 230 operating on the mobile device). The mobile device 410 may connect to the network 420 (e.g. the Internet or the location's intranet) using the cellular radio or Wi-Fi of the mobile device 410 to connect to the remote server 430. The application provides the user's authentication credentials and location to the remote server 430, which then utilizes that information to determine whether the user is authorized to access the area. In various embodiments, the remote server 430 may have one or more authentication lists stored in the database 440. Upon determining whether the user is authorized to access the location, the remote server responds to the mobile device via that the user is authorized. The application may then activate the visual indicator on the smart identification badge 400.

Referring to FIG. 4B, in various embodiments, the smart identification system includes the smart identification badge 450. In this embodiment, the smart identification badge 400 is configured to communicate with an electronic device 460 that is setup at a location (e.g. a workstation, kiosk, tablet, laptop etc.) using Bluetooth, Wi-Fi, or other suitable communication means instead of a user device. The electronic device 460 is configured to communicate with a remote server 430 using a network 420. In various embodiments, the smart identification badge 450 may operate a smart ID module (e.g., the smart ID module 260), the electronic device 460 may operate an authentication module (e.g., the authentication module 270), and the remote server 430 may operate a verification module (e.g., the verification module 280).

In various embodiments, an application operating on the location's electronic device 460 is also configured to facilitate the operation of a visual indicator on the smart identification badge 450. For example, in various embodiments, the user may access the application on the electronic device 460 upon arrival at the location. The user may access the application to provide their authentication credentials (e.g. a password and/or a biometric authentication) and the electronic device 460 may be at a fixed location known to the system. The electronic device 460 may connect to the network 420 (e.g. the Internet or the location's intranet) using the cellular radio or Wi-Fi of the electronic device 460 to connect to the remote server 430. The application provides the user's authentication credentials and location to the remote server 430, which then utilizes that information to determine whether the user is authorized to access the area. In various embodiments, the remote server 430 may have one or more authentication lists stored in the database 440. Upon determining whether the user is authorized to access the location, the remote server responds to the electronic device via that the user is authorized. The application may then activate the visual indicator on the smart identification badge 450.

Referring to FIG. 4C, in various embodiments, the smart identification system includes the smart identification badge 470. In various embodiments, the smart identification badge 470 may be configured to operate without the aid of a mobile or other electronic device and may include an integrated user interface (e.g., the user interface 220), location services (e.g., location services 230), and communications (e.g., communication 240) along with operating a smart ID module (e.g., the smart ID module 260) and an authentication module (e.g., the authentication module 270). In this embodiment, a verification module may operate on the remote server 430, however, in some embodiments, the verification module may also operate on a smart identification badge. In this embodiment, the user provides each input to the smart identification badge which in turn communicates with the remote server 430 using the network 420 to determine the user's access privileges for their current location.

Accordingly, the above described embodiments of the present disclosure provide a smart identification system. The smart identification system provides a quick and secure way of providing users with the ability to check-in at various locations and visually confirm that they are authorized to be present at the location The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of using a smart identification badge comprising:
   securely connecting the smart identification badge with a smart phone of a user, the smart identification badge having thereon a visual indicator that is initially deactivated;
   receiving, by the smart phone, a login credential from a user;
   using the login credential to authenticate the user;
   comparing a location of the smart phone of the authenticated user to a secured location;
   sending the authenticated user login credential and the secure location to a remote server, upon determining that the authenticated user has arrived at the secure location; and
   activating the visual indicator on the smart identification badge only upon receiving, from the remote server, an authorization to activate; and
   wherein the authorization to activate is generated at the remote server responsive to verifying an access right for the authenticated user at the secure location by comparing the login credential and the secure location to an access list associated with the secure location.

2. The method of claim 1, wherein the user login credential comprises at least one of a user identifier and a biometric information.

3. The method of claim 1, wherein determining that the authenticated user has arrived at the secure location comprises monitoring the user's location using existing location services on the smart phone and determining when the user has arrived at a proximity threshold of the secure location.

4. The method of claim 3, wherein monitoring the user's location is determined using at least one of: Wi-Fi position sensing, cellular tower triangulation, a global positioning system (GPS) signal and a marker physically located at the location.

5. The method of claim 1, further comprising:
   determining, by the remote server, when an end of the access right is to occur; and
   ceasing the authorization to activate at the determined end of the access right, thereby deactivating the visual indicator on the smart identification badge.

6. The method of claim 5, wherein the end of the access right comprises at least one of determining a time period has expired or determining the user has left the location.

7. The method of claim 1, wherein the secured location is one of a plurality of predefined secured locations, and further comprising comparing the location of the smart phone of the authenticated user to each secured location of the plurality of secured locations.

8. A smart identification system comprising:
   a smart identification module operating on a smart identification badge, wherein the smart identification module is configured to initially deactivate a visual indicator on the smart identification badge and control the operation of the visual indicator on the smart identification badge responsive to a received authorization to activate signal;
   an authentication module operating on a smart phone of a user, the smart phone being securely connected to the smart identification badge, wherein the authentication module is configured to:
   communicate with the smart identification module using a communications circuit;
   use a user-provided login credential to authenticate a user on the smart identification system;
   compare a location of the smart phone of the authenticated user to a geographic area of a secured location;
   send the authenticated user login credential and the secure location to a remote server, upon determining that the smart phone is at a proximity threshold of the secured location; and
   a verification module operating on a remote server, wherein the verification module is configured to:
   communicate with the authentication module to receive the secure location and the user login credential;
   verify an access right for the authenticated user at the secure location by comparing the user credential and the secure location to an access list associated with the secure location; and
   generate the authorization to activate signal for the smart identification module upon verification of the user's access right.

9. The system of claim 8, wherein the communications circuit comprises at least one of a near field communications circuit, a radio frequency identification circuit, a Wi-Fi communications circuit, and a Bluetooth communications circuit.

10. The system of claim 9, wherein the authentication module is further configured to monitor a location of the smart phone of the authenticated user and determine when the smart phone of the authenticated user has arrived at the secure location.

11. The system of claim 10, wherein the location of the smart phone of the authenticated user is determined using at least one of a global positioning system (GPS) signal or a marker physically located at the location.

12. The system of claim 8, wherein the authentication module is further configured to provide a key to the smart identification badge and the smart identification module is configured to verify the key with an embedded key stored on the smart identification badge before allowing further communications with the authentication module or verification module.

13. The system of claim 8, wherein the user login credential comprises at least one of a user identifier and a biometric information supplied by the user to the smart phone.

14. The system of claim 8, wherein the verification module is further configured to:
    determine a time period for which the visual indicator will remain active; and
    cease generating the authorization to activate signal after the time period has expired.

15. The system of claim 14, wherein the smart identification module is further configured to deactivate the visual indicator when the user has left the secure location.

16. The smart identification system of claim 8, wherein the secured location is one of a plurality of predefined secured locations, and the authentication module is further configured to compare the location of the smart phone of the authenticated user to each secured location of the plurality of secured locations.

17. A smart identification badge comprising:
    a communications circuit;
    a memory;
    a visual indicator that is initially deactivated; and
    a processor configured to execute instructions stored in the memory, that when executed by the processor, cause the processor to:
        connect to personal electronic device (PED) of a user using the communications circuit;
        activate the visual indicator after receiving an authorization to activate signal from the PED using the communication circuit wherein the authorization to activate signal is supplied by the PED only after the PED has:
            authenticated the user based on a user supplied login credential;
            compared a location of the PED to a geographic area of a secured location;
            sent the user login credential and the secure location to a remote server, upon determining that the PED is at a proximity threshold of the secured location; and
            received verification that the authenticated user has an access right at the secure location by comparing the user credential and the secure location to an access list associated with the secure location.

18. The smart identification badge of claim 17, wherein the communications circuit comprises at least one of a NFC circuit, a Wi-Fi communications circuit, a RFID circuit, and a Bluetooth communications circuit.

19. The smart identification badge of claim 17, wherein the memory further stores an embedded key and wherein the instructions further cause the processor to:
    receive a key from the PED using the communications circuit;
    verify that the key received from the PED corresponds to the embedded key; and
    allow for further communications from the PED using the communications circuit only upon verification of the key.

20. The smart identification badge of claim 17, further comprising a display, wherein the instructions are further configured to cause the processor to activate the display.

* * * * *